United States Patent [19]
Andersson et al.

[11] Patent Number: 5,936,951
[45] Date of Patent: Aug. 10, 1999

[54] DYNAMIC INFRASTRUCTURE

[75] Inventors: Staffan Andersson, Enskede; Torgny Anders Lindberg, Tullinge; Erik Lennart Bogren, Älvsjö ; Lars Novak, Lund, all of Sweden

[73] Assignee: Telefonaktiebolaget LM Ericsoon, Stockholm, Sweden

[21] Appl. No.: 08/956,133

[22] Filed: Oct. 22, 1997

Related U.S. Application Data

[63] Continuation of application No. PCT/SE96/00544, Apr. 24, 1996.

[30] Foreign Application Priority Data

Apr. 26, 1995 [SE] Sweden .................................. 9501543

[51] Int. Cl.⁶ .............................. H04L 29/08; H04L 12/24
[52] U.S. Cl. .......................... 370/351; 370/228; 370/230; 370/237; 370/400
[58] Field of Search .................................... 370/237, 351, 370/400, 228, 230, 231, 235, 218, 219, 220, 387, 468; 375/260

[56] References Cited

U.S. PATENT DOCUMENTS

| | | |
|---|---|---|
| 4,669,113 | 5/1987 | Ash et al. . |
| 4,884,263 | 11/1989 | Suzuki ..................... 370/228 |
| 5,014,262 | 5/1991 | Harshavardhana ...................... 370/237 |
| 5,031,211 | 7/1991 | Nagai et al. . |
| 5,042,027 | 8/1991 | Takase et al. ........................... 370/351 |
| 5,058,105 | 10/1991 | Mansour et al. . |
| 5,182,744 | 1/1993 | Askew et al. . |
| 5,241,533 | 8/1993 | Kimoto et al. ........................... 370/237 |
| 5,359,596 | 10/1994 | Sadiq . |
| 5,497,368 | 3/1996 | Reijnierse et al. ....................... 370/351 |
| 5,539,815 | 7/1996 | Samba .................................... 370/228 |
| 5,548,639 | 8/1996 | Ogura et al. ........................... 370/228 |

FOREIGN PATENT DOCUMENTS

| | | |
|---|---|---|
| 464 283 | 1/1992 | European Pat. Off. . |
| PCT/SE96/ 00544 | 4/1996 | Sweden . |

OTHER PUBLICATIONS

Widl, Walter, "Telekommunikationsnätets Arkitektur", Ericsson Review, vol. 67, No. 4, pp. 148–162, Dec., 1990.

Widl, Walter et al., "In Search of Managed Objects", Ericsson Review, vol. 69, No. 1–2, pp. 34–56, 1992.

*Primary Examiner*—Chi H. Pham
*Assistant Examiner*—Frank Duong
*Attorney, Agent, or Firm*—Burns, Doane, Swecker & Mathis, L.L.P.

[57] ABSTRACT

A method of dynamic resource allocation in a stratified network structure having a dynamically switched first stratum network and at least a second stratum network underlying the first overlying stratum network. At least a first route in the first stratum is provided with a first relation which points out two access points in the second stratum. A connection between the access points in the second stratum network is established and includes a second number of resources generally referred to as an infrastructure. The infrastructure is finally assigned to the first route.

16 Claims, 11 Drawing Sheets

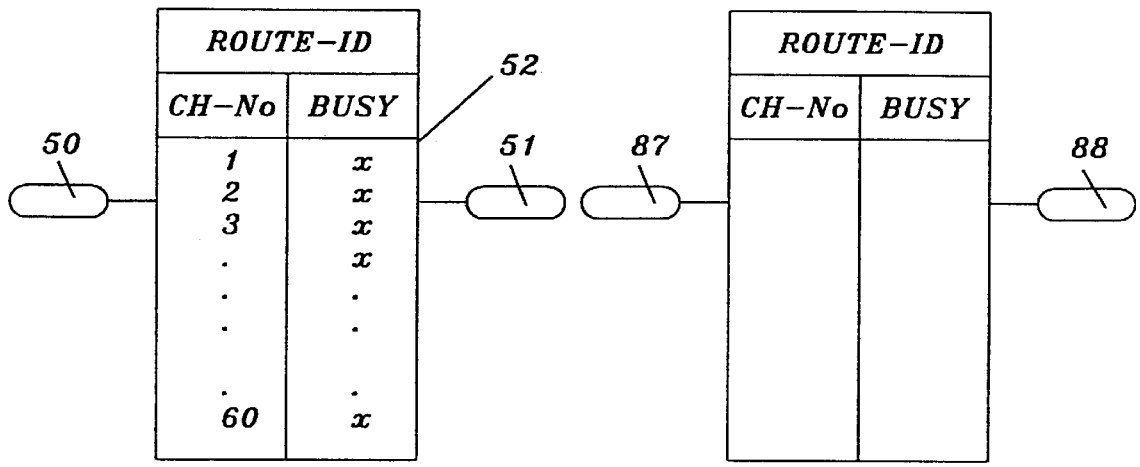
*FIG. 6*      *FIG. 12A*
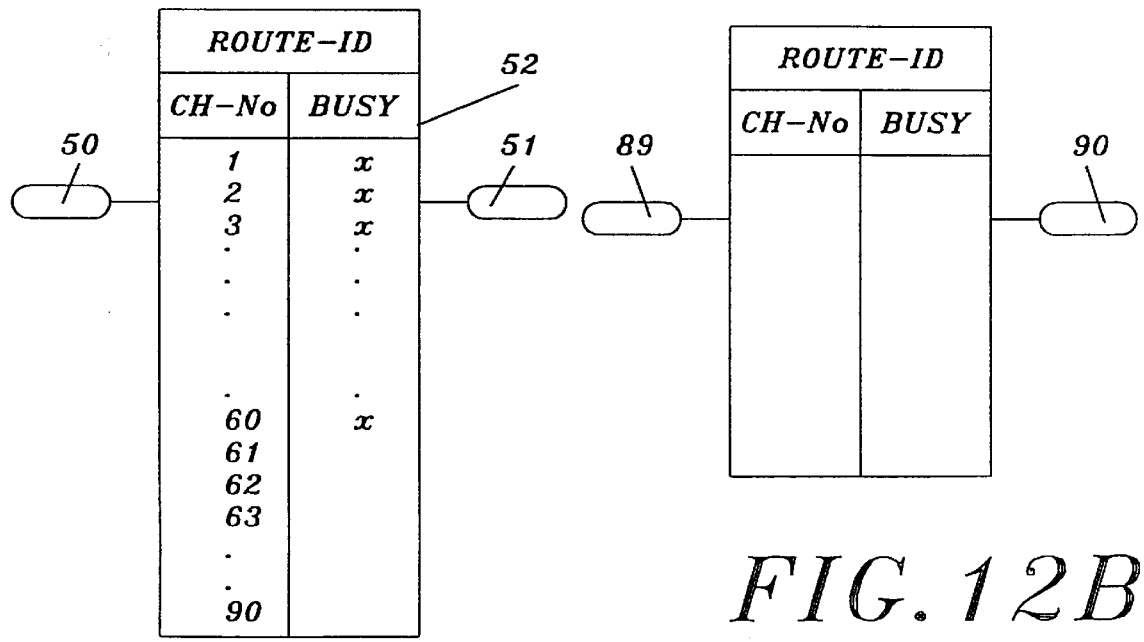
*FIG. 7*      *FIG. 12B*

DYNAMIC INFRASTRUCTURE

This application is a continuation of International Application No. PCT/SE96/00544, filed Apr. 24, 1996, which designates the United States.

BACKGROUND

This invention relates to telecommunication networks, in particular to allocation of resources in a stratified reference model.

A stratified reference model is a generalization of the OSI reference model that enables a description of complicated network-on-network structures. Each network level is referred to as a stratum. A stratum is a logical model of a physical transmission network. A stratum describes nodes and routes between the nodes. The physical transmission network modelled by a stratum comprises nodes and links. Links are grouped into trunks which extend between the nodes. The various stratum networks are defined by configuration data. The different strata together make up a stratified transport network. Each stratum is associated with a respective bearer service. By bearer service is meant a service providing transport of data. Different strata have different bearer services.

In order to avoid misconceptions the following definitions are used: A connection is used to transfer information between two end points. A connection is created in various ways. For example a connection is created by cross connection, by manual switching or by switching. Cross connected connections are created in for example cross connecting devices, manually switched connections are created for example in connector matrixes by soldering and switched connections are created on demand, for example by dialling a directory number on a telephone.

A channel is a means for unidirectional transmission. A channel is used to carry information from one point to another. To transmit information from A to B one channel is required, said one channel having a direction from A to B. To transmit information from B to A another channel is required, said another channel having the opposite direction of said one channel.

Two oppositely directed channels extending between the same pair of points are in the following referred to as a channel pair. Several channel pairs together make up a link. A link is a physical system (that transports information). Accordingly, a link carries channel pairs. The maximum number of channel pairs a link can carry depends on the bearer service and on the properties of the physical system.

A route is a logical conception. A route comprises a number of channel pairs and is used to interconnect two nodes. In theory there is no maximum number of channel pairs a route can comprise. The conception of route is used to define the way a connection follows between nodes of a stratum. This is referred to as routing and is conventional.

At each end of a link there is an exchange terminal ET. An ET operates to "insert" or multiplex together a number of channel pairs on one and the same link and to "extract" or demultiplex channel pairs from said same link.

The above definitions are explained in connection with FIG. 1 and FIG. 2. In FIG. 1 there is one route R1 extending between two nodes N1 and N2. As an example route R1 carries 96 channels so distributed that there are 48 channels in each one of two opposite directions, i.e. route R1 carries 48 channel pairs. FIG. 1 is a logical description of the physical transmission system shown in FIG. 2. In FIG. 2 there are two links L1 and L2 extending between nodes N1 and N2. At each end of links L1 and L2 there-is a respective exchange terminal ET. Suppose the bearer service is STM 64, the link L1 will carry 64 channels so distributed that there are 32 channels in each one of the two opposite directions. Accordingly link L1 carries 32 channel pairs. In the same manner link L2 carries 32 channel pairs. All 32 channel pairs of link L1 but only 16 channel pairs of link L2 are grouped into route R1 which accordingly will hold 48 channel pairs. In the physical transmission system shown in FIG. 2 the remaining 16 link elements of link L2 not used in route R1 may form part of another route, not shown in FIG. 1. In FIG. 2 nodes N1 and N2 correspond to nodes N1 and N2 in FIG. 1.

In FIG. 3 three strata 1, 2, 3 are shown, each such stratum representing a logical view of a non shown physical transport network. Stratum 1 comprises three nodes 10–12, stratum 2 three nodes 20–22, and stratum 3 four nodes 30–33. Stratum 1 comprises three routes 13–15, stratum 2 three routes 23–25 and stratum 3 three routes 34–36. As an example the bearer service at stratum 1 is 64 kbps STM (synchronous transmission mode). As an example the bearer service at stratum 2 is 2 Mbps STM (in the U.S.A. 1.5 Mbps STM). As an example the bearer service at stratum 3 is 155 Mbps STM. As an example routes 13, 14, 15, 25 and 34 are shown to comprise the channel pairs of two links, while routes 23, 24, 35 and 36 are shown to comprise the channel pairs of just one link. A link is indicated by a solid line. The links of route 13 are denoted 40 and 41. At each stratum there are access points to the different networks. These access points are shown schematically by filled points at each stratum. Each access point has a connection to a node in a respective stratum. In stratum 1 the connections from the access points to node 10 are collectively shown at 16, the connections from the access points to node 11 are collectively shown at 17 and those to node 12 are shown at 18. Similar connections 26 and 27 exist at stratum 2. Similar connections 37, 38 at stratum 3 do also exist. Access units are connected to access points. The access units are used for communication. As an example of access units two telephone sets A and B are shown at stratum 1. Access unit are also present at stratum 2 and are symbolically shown at C and D respectively. Examples of access units at stratum 2 are main frame computers. At stratum 3 access units are shown symbolically at E and F respectively. In the non shown physical transport network each one of the connection 16, 17, 18, 26, 27, 28,37, 38, is at its respective node side connected to its respective node by way of an exchange terminal ET. Still speaking in terms of the physical transport network such exchange terminals could be ordinary line interface circuits; LIC:s, in case the bearer service is STM 64 Mbps.

An exchange terminal ET in a stratum is shown as a small unfilled rectangle in the accompanying drawings.

The nodes 10–12 at stratum 1 generally comprise switch fabrics. An exchange in the physical transport network would correspond to one or more switch fabrics in different strata. Cross connectors in the physical transport network would correspond to the nodes 20–22 in stratum 2. Wire connections in the physical transport network would correspond to the nodes 30–33 in stratum 3.

Stratum 1 forms a switched network in the sense that it is possible to route a connection from an originating access unit to a terminating access unit by dialling, at the originating access unit, the telephone number to the terminating access unit. Stratum 2 is generally a non-switched network. A connection from C to D is generally a fixed leased connection which is set up, on a long time basis, by a network operator. Stratum 1 is a non-switched network.

At stratum 1 each route 13, 14, 15 represents a number of resources between two nodes, said resources existing in the form of channel pairs.

The nodes 10, 20 and 30 may or may not correspond to each other depending on the structure of the physical transport network. Generally they do not correspond to each other since their physical counterparts in the physical transport network are located at geographically different sites. The nodes 10, 20 and 30 would correspond to each other if the exchange, the cross connector and the wired connection are all located at the same geographical site. The same considerations apply for nodes 11, 21, 31 and for nodes 12, 22, 32.

The items described above together make up a traffic system. The traffic at each stratum varies depending on the time of the day, the day of the week and may also depend on other criterions. As an example a head office of a company that has sales offices in several cities wants the sale offices to report back to the head office all items sold during a day. The corresponding information should be sent to the head office during nighttime. The time it takes to complete such a data transmission may be unacceptably long if transmission takes place using the bearer service at the stratum 1 level. This is so because of the restricted bandwidth offered by the 64 kbps STM network. Instead the company has leased a number of 2 Mbps connections connecting the sales offices with the head office. The 2 Mbps connections are set up in stratum 2 by the network operator of stratum 2. Such set up is done manually by the network operator with the aid of an operating and support system, OSS, 29. The leased 2 Mbps connections at stratum 2 are set up nighttime between for example 8 pm and 5 am. At daytime said leased connections at stratum 2 are used for other traffic. In this manner the network operator reconfigures the resources of stratum 2 at predetermined times in order to make use of his resources as efficiently as possible. The OSS 29 controls and monitors the operation of the nodes and routes at stratum 2. There is also an OSS 39 for controlling and monitoring the corresponding items at stratum 3.

Manual set up of connections at stratum 2 at predetermined times is a rigid method of meeting the traffic demand from users. The users must notify the network operator of their demands and the network operator must set up the connections manually. Should a user need to use a leased connection at other times than agreed upon the network operator must be contacted. The network operator then has to examine the current traffic situation in stratum 2, assign a link to the requesting user and manually set up the connection for a fixed time period. The time delay between custom demand and set up of a demanded connection may take days.

Since the connections at stratum 2 are leased for fixed time periods and since the traffic demand may change during said fixed time periods the network resources of the physical network are not used efficiently.

U.S. Pat. No. 5,058,105, U.S. Pat. No. 5,182,744, U.S. Pat. No. 5,031,211 relate to methods and devices for enhancing the reliability of a communication network so that traffic which is disrupted by, for example, a faulty link, may quickly be restored to service. Various methods are described for determining alternate routes to which the disrupted traffic is transferred.

U.S. Pat. 4,669,113 relates to a nonhierarchial switching system employing an algorithm for developing link sizes for paths that connect switches in the switching system. This is achieved by having each switch in the switching system to send idle trunk information to a central integrated network controller on a periodic, for example 5-second, basis when trunk status changes occur, i.e. idle trunks are created or removed. Based on the received traffic information the integrated network controller determines the required number of trunks for each link using a process that adjusts for the traffic handling capacity between nodes based on the availability of alternate routes.

EP-A2-464 283 relates to allocating a limited common resource, such as trunks for video conferencing, among a plurality of demands for the resource. An allocation methodology is shown which makes it possible to allocate the bandwidth of a communication path in the network among a plurality of customer demands for that bandwidth. Examples of customer demands for a conference are start time, stop time, maximum bandwidth and minimum bandwidth. To each conference reservation there is associated "binding" comprising a four-tuple of the form (X1, X2, X3, X4) where X1 and X2 refer to specific positions within the bandwidth of the communication path and X3 and X4 refer to the start time and stop time respectively of the conference. A customer site represents one or more endpoints. An allocation arrangement receives demands from a customer site for allocating the network for a communication among a plurality of customer sites. The allocation arrangement stratifies the received demands in response to a grouping of endpoints to be conferenced and can then allocate the network resources in response to the stratified demand. Accordingly the allocation process takes place at predetermined points of time in accordance with a customer's demands and is not driven by the current traffic load.

In Ericsson Review, Vol. 67, Nr. 4, Dec. 1990, Stockholm, Walter Widl, "Telekommunikationsnätets arkitektur", p 148–162 there is described how a telecommunication network is given a layered structure in respect to transmission. A number of static connections are shown. In particular there is shown how information, relating to a connection, is flowing in the various layers. The article does not describe how and when the connections are set up.

SUMMARY

An object with the present invention is to provide a method and a system for providing a connection along a route of a higher stratum using dynamic allocation of an infrastructure of a lower stratum in a stratified network structure avoiding the drawbacks with prior art technique.

In particular the allocation of an infrastructure of a lower stratum to a higher stratum takes place on demand in response to the current traffic situation along a route of said higher stratum.

In accordance with still another aspect of the invention the allocation of an infrastructure of a lower stratum to a higher stratum is controlled from within the traffic system. No system external OSS is involved in the allocation process and accordingly no operator needs to be contacted when the allocation should be done. The allocation can therefore take place dynamically and on demand.

In accordance with another aspect of the invention the allocation process allows for repetitive allocations of infrastructures from a number of underlying strata to an overlaying stratum.

The above objects are achieved by providing a route with a first reference associated with one end of said route and a second reference associated with the opposite end of said route. The first reference refers to a first access point resident in a lower stratum. The second reference refers to a second access point resident in said lower stratum. From the node at said one end of said route there is provided a wired connection to said first access point in said lower stratum. Likewise, from the node at said opposite end of said route there is provided a similar wired connection to said second access point resident in said lower stratum.

When control logic requests the set up of a connection in a first stratum said connection typically extends along a number of routes. Suppose that the traffic load along one of said routes is so heavy that all the resources of said one route are busy. Traditionally the connection request is rejected during such circumstances. In accordance with the invention the control logic at first examines said one route to see if it has associated therewith the above mentioned references. If it hasn't the connection request is rejected, but if it has, the control logic will take the references and send them, in a second connection request, to the stratum associated with the access points. The second connection request requests set up of a connection between the two access points with which the references are associated. Typically the access points are resident in a stratum, referred to as the second stratum, next below the one in which said one busy route is resident. The second connection request will therefore be transmitted to the second stratum. Control logic associated with the second stratum will examine the second stratum network to see if a connection between the access points can be set up. Suppose there are free resources along a route between the access points in the second stratum. The control logic associated with the second stratum will now set up a connection between the access points. This connection constitutes an infrastructure for the first stratum. In this way the infrastructure becomes available to the first stratum at said opposite end nodes. In the following the infrastructure is said to be assigned to the stratum. The resources of the infrastructure comprises a number of channel pairs as will be explained below. In the assigned infrastructure one channel pair is seized and is used for setting up the originally requested connection, while the rest of its channel pairs are ready for use by future connections.

Accordingly the allocation of an infrastructure takes place on demand when, at said higher stratum, there are no more channel pairs available for traffic along a route at said higher stratum, but there is still a demand for setting up new connections along said route. When the allocated resources no longer are used by said higher stratum the infrastructure is returned to the lower stratum and can now be accessed by said lower stratum. In this way the combined structures of the two strata involved in the allocation process are used efficiently. The resources of the infrastructure will thus be used more efficiently than before.

In accordance with an embodiment of the invention the first reference refers to a group of first access points resident in said lower stratum and the second reference refers to a group of second access points also resident in said lower stratum. Between the node at said one end of said route and each of the first access points there is provided a respective wired connection. Likewise there are provided wired connections from the node at said opposite end of said route to each one of the second access points resident in said lower stratum. When reference is made to said first and second references one access point in the group of said first access points are selected and a one in the group of said second access points is selected and a connection, in said lower stratum, is set up between the said two selected access points.

BRIEF DESCRIPTION OF THE DRAWINGS

The novel features believed characteristic of the invention are set forth in the appended claims. The invention itself, however, as well as other features and advantages thereof, will be best understood by reference to the detailed description of the specific embodiment which follows, when read in conjunction with the accompanying drawings, wherein;

FIG. 6 is a list of idle resources associated with a route to which an infrastructure can be allocated, FIG. 7 is the list of idle resources in FIG. 6 to which an infrastructure has been dynamically allocated, FIGS. 12A and 12B are lists of idle resources similar to those shown in FIG. 6.

DETAILED DESCRIPTION

Figure 1:
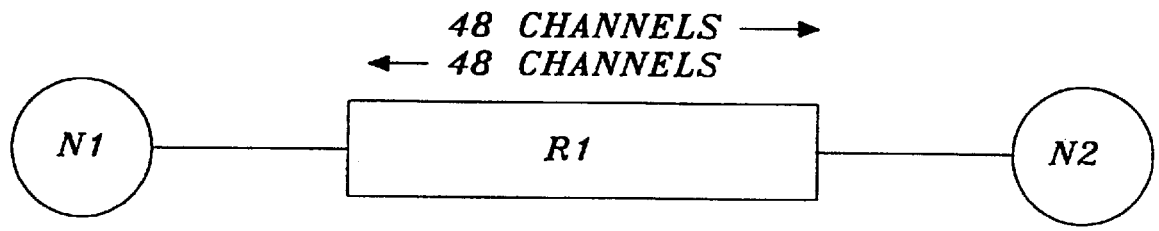
FIG. 1 is a block diagram of a route extending between two nodes.
Figure 2:
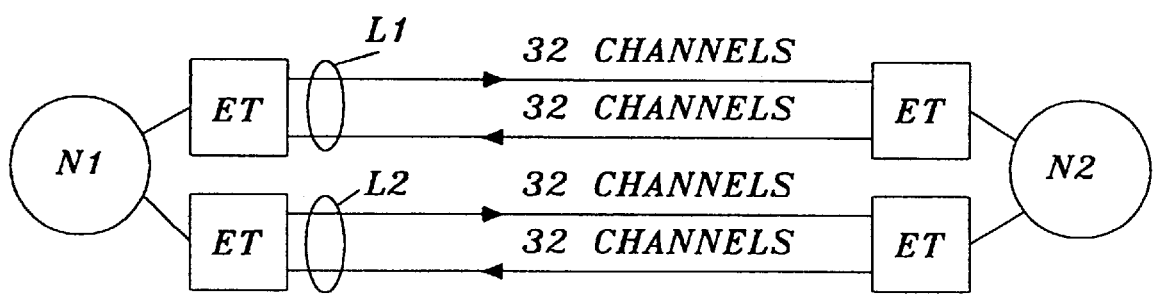
FIG. 2 is a detailed view of the route shown in FIG. 1.
Figure 3:
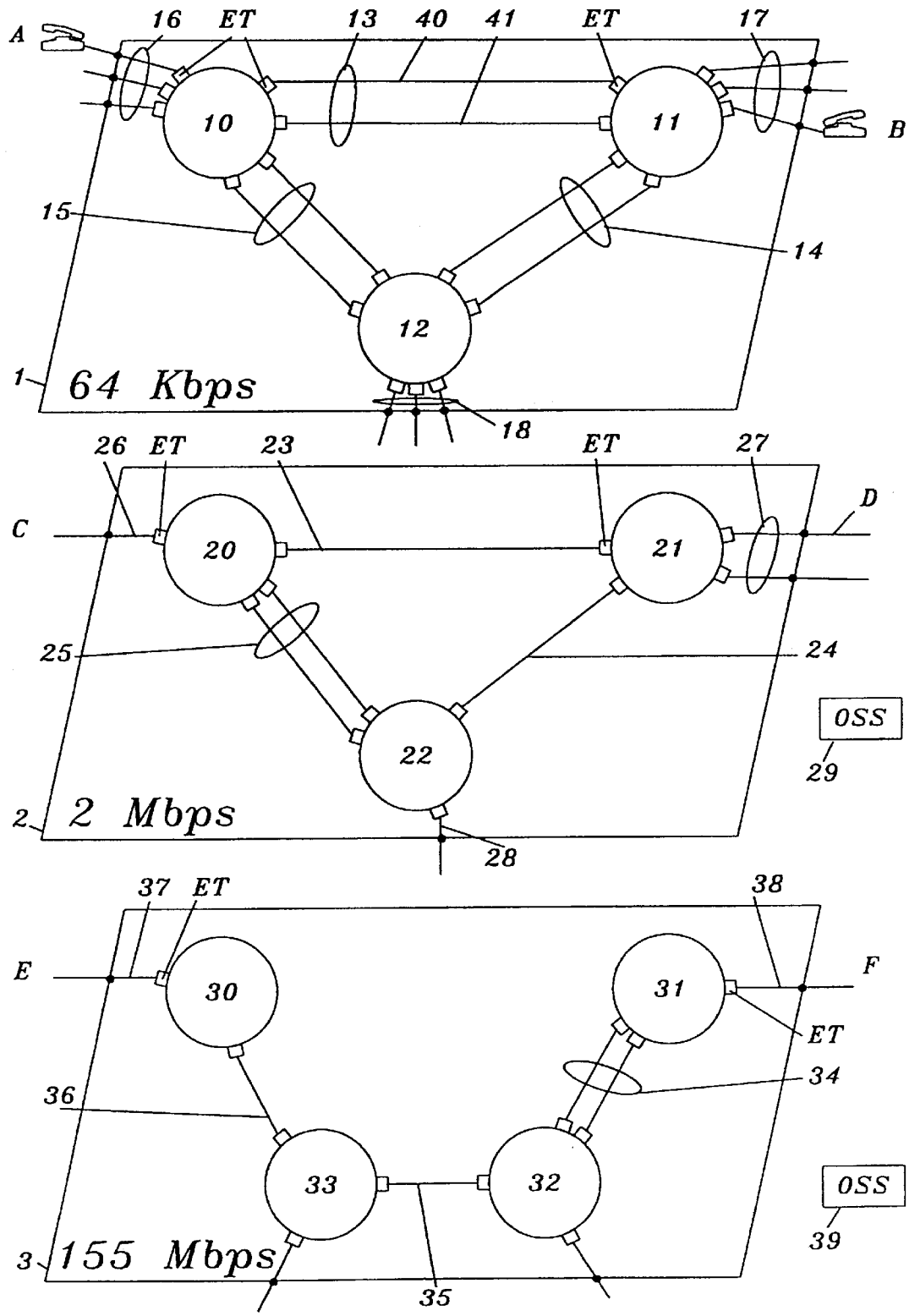
FIG. 3 is a simplified schematic view showing a stratified network structure in accordance with known technique.
Figure 4:
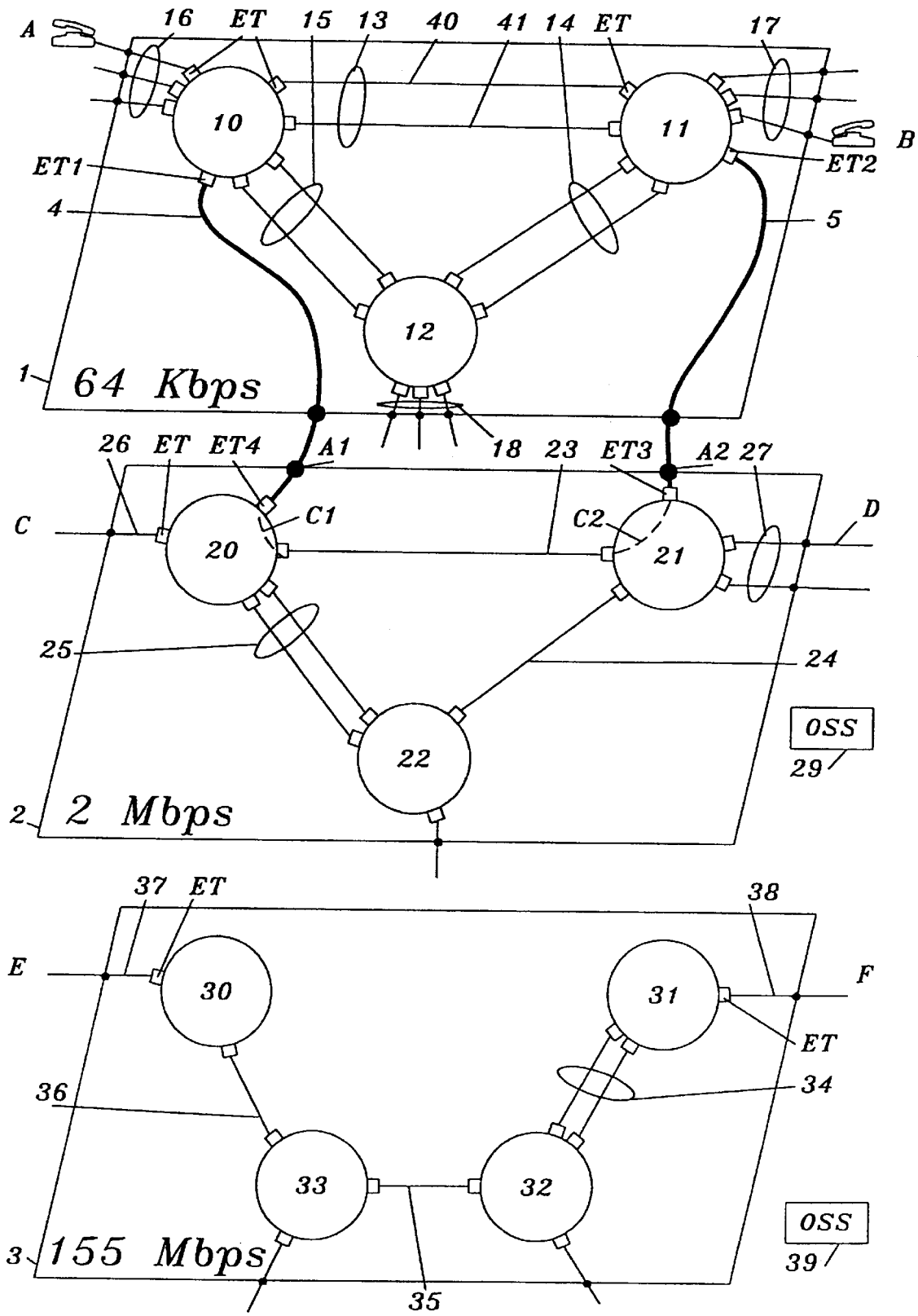
FIG. 4 is a simplified schematic view of the stratified network structure in FIG. 3 modified in accordance with the invention.

FIG. 4 is similar to FIG. 3 with the exception that there are two physical connections 4 and 5 between stratum 1 and stratum 2. In particular physical connection 4 extends from ET1 of node 10 to ET4 of node 20. The physical access point at ET4 of node 20 is labelled A1. Physical connection 5 extends in a similar fashion from ET2 of node 11 to ET3 of node 21. The physical access point at ET3 of node 21 is labelled A2. In this manner there is created two physical connections between stratum 1 and 2. At stratum 2 it is possible to set up a connection between A1 and A2 using 2-Mbps connections of stratum 2. As an example a connection can be set up between A1 and A2 using route 23. As another example an connection between A1 and A2 can be set up using routes 25 and 24. For the moment, and in order to explain the mechanism of the present invention, it is supposed that a non shown control system in stratum 2 receives a request from another non shown control system in stratum 1 to set up a connection between A1 and A2. The OSS 29 checks its traffic to find out a free route between A1 and A2. Say for example that route 23 is free. Said non shown control system in stratum 2 seizes route 23 and connects the ET:s at each end of the seized route to the respective ET:s at which A1 and A2 are. Such connections are schematically indicated by the broken lines C1 and C2 and are done internally in the nodes 20 and 21 of the respective connections points A1 and A2. Now there is a 2 Mbps connection 4-A1-C1-23-C2-A2-5 which terminates at ET1 and ET2. ET1 and ET2 in stratum 1 will now determine the bit rate at which said connection 4-A1-C1-23-C2-A2-5 is operated. Since ET1 and ET2 multiplex at a bit rate of 64 kBit/s said connection 4-A1-C1-23-C2-A2-5 will also be driven at this speed. Said connection will accordingly add resources in the form of 32 channel pairs to route 13, each such channel pair being propagated at a speed of 64 kB/s and being carried by the 2 MBit/s connection at stratum 2. Typically one or two of the added 32 channel pairs are used for signalling purposes.

One might find it difficult to understand how physical connections can be made between logical layers as shown in FIG. 4. It should be noted that FIG. 4 is just a picture of logical networks. Behind the picture there is a non-shown physical transport network and it is in this physical network the wired connections are made. In particular they are made between links belonging to the physical transport network.

How the physical network looks like is no part of the invention. The manner in which applicant illustrates the invention is independent of the exact layout of physical network. In the example shown in FIG. 4 there are three nodes 10, 11, 12 at stratum 1 and three nodes 20, 21, 22 in stratum 2. Node 20, for example, is resident in the same physical node as that one in which node 10 is resident. Node 21, for example, is resident in a cabinet standing beside another cabinet in which node 11 is resident. In the first case a physical connection is made within one and the same node and in the second case the physical connection is made between the nodes in the two cabinets. If the physical layer looks different than the one just exemplified, then the physical connections would be wired differently.

Figure 5:
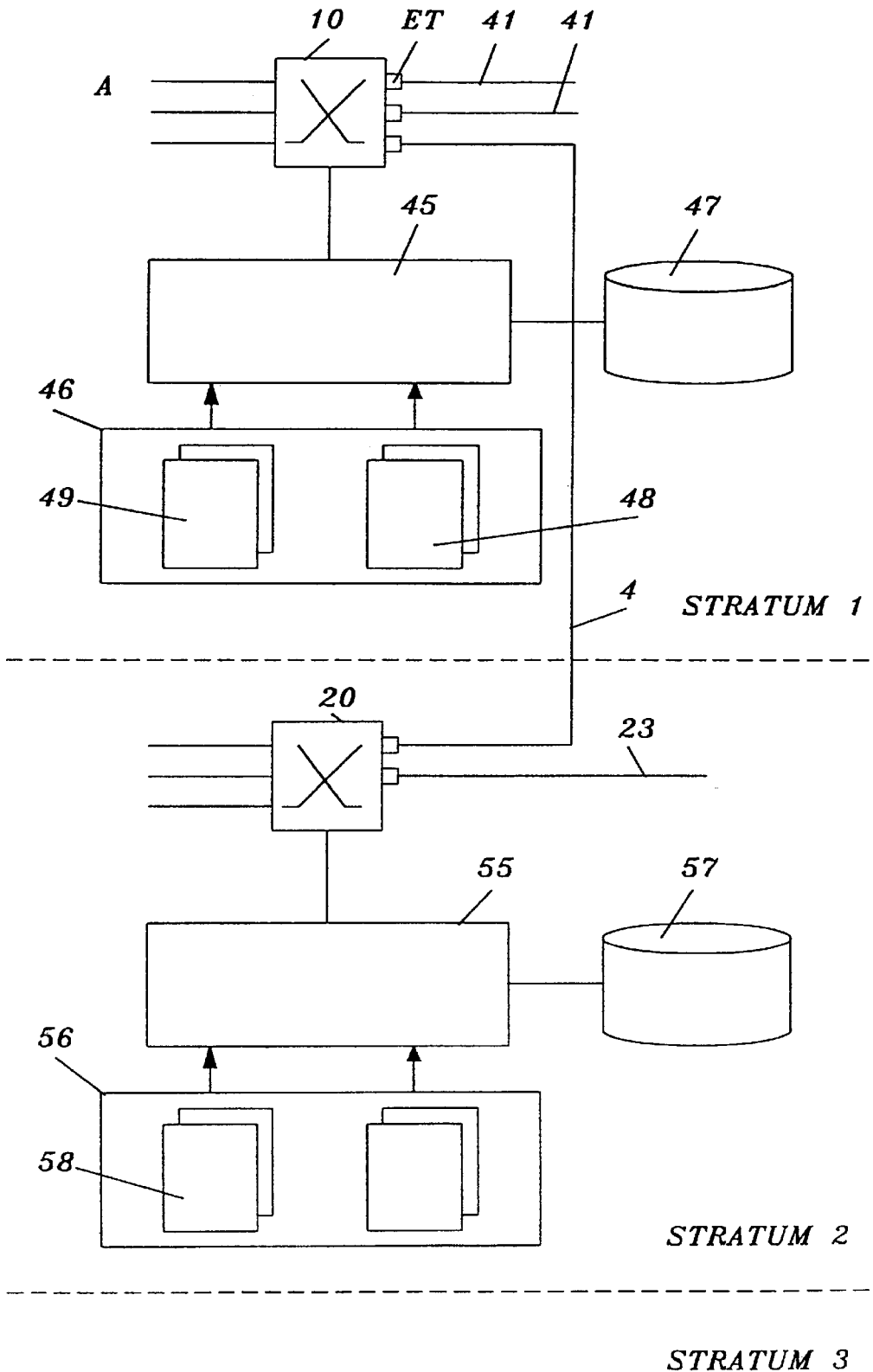
FIG. 5 is a schematic block diagram of nodes 10 and 20 in strata 1 and 2 respectively in FIG. 4.

In FIG. 5 the node 10 is shown in detail and comprises further to a switch 10, a processor 45 and control programs 46. Moreover there is a data base 47 comprising i.a. a network description of the resources of stratum 1. Such descriptions comprise i.a. conventional routing tables used for routing of a call through a network as well as link tables of the kind shown in FIGS. 6, 7 and 12B, such link tables being used to record the current state of the individual channel pairs of a particular route, i.e. whether an individual channel pair is occupied or not.

The control program module 46 comprises several individual programs, among these a call set-up program 48 and a resource handler 49. In a similar way node 20 of stratum 2 comprises a processor 55, a program module 56 and a data base 57. The program module 56 comprises several control programs, i.a. a call set-up program 58, and link tables of the kind shown in FIG. 12A.

In practice processors 45 and 55 may physically be one and the same processor and this is also possible for the data bases 47 and 57.

A route at stratum 1 comprises one or more links. To each route there is associated a respective route table. In FIG. 6 a route table 52 is shown. As an example the route associated with route table 52 is route 13. Route 13 comprises two links link 40, 41 each of which comprises 32 channel pairs, some of which may be used for signalling purposes. The remaining 30 channel pairs are available for traffic. This gives a total of 60 channel pairs for route 13. The available channel pairs are numbered 1, 2 . . . 60. Each such channel pair has a status, busy and non-busy. In accordance with the invention the route table 52 has two references, symbolically shown at 50 and 51. Each reference represents a relation. In particular there is: (i) a first relation between a first end of route 13 and a first access point situated at a lower stratum, said first end of the route being connected to said first access point, and (ii) a second relation between the other end, referred to as the second end, of the same route 13 and a second access point, also situated at a lower stratum, said second end being connected to said second access point. The two access points, A1 and A2 in the illustrated example, must not coincide but must be located at the respective ends of route 13 in stratum 1. In stratum 2 there can be several nodes between the access points A1 and A2. In particular the presence of reference 50 at link table 52 indicates that the left end of route 13 is connected to access point A1 in stratum 2 and the presence of reference 51 at indicates that the right end of route 13 is connected to access point A2 in stratum 2. In accordance with the present invention the two access points A1 and A2, which represent the two ends of route 13, should be connected with each other in stratum 2. As indicated above such a connection is referred to as an infrastructure.

Allocation of an infrastructure to a higher stratum is initiated on demand when predefined conditions are fulfilled. As one example the allocation of an infrastructure is initiated when all channel pairs of links 40 and 41 have been seized and the traffic continues to increase along said route 13. As another example allocation of an infrastructure is initiated when there are some few, say for example 5, channels available in link table 52 and the traffic load along said route 13 is at or above a predefined level. Other parameters and combination of parameters may govern the point of time at which allocation of an infrastructure is initiated.

Two different means by which the allocation process of an infrastructure is initiated are suggested in accordance with the present invention. In accordance with one embodiment control logic, resident in stratum 1 or stratum 2 or in both strata, is the means by which the infrastructure allocation process is initiated. This embodiment was described shortly above and will be described in detail further down. In accordance with another embodiment of the invention the means by which the allocation process is initiated is a signalling procedure.

One signalling procedure is a signalling which is associated with the access point A1 and which uses an identification of access point A2 (a roaming number). As an example such signalling is an out of band signalling procedure.

Another signalling procedure is to request the connection between A1 and A2 by sending the request to the operation and support system OSS 29 via a non shown traffic management system TMN using the Q3 interface.

In the particular example of FIG. 4 the connection that constitutes an infrastructure is set up between access points A1 and A2. This connection may follow either the direct way route 23 between A1 and A2 or the multi way route formed by routes 25 and 24 via node 22.

When a connection is established between a user connected to node 10 and another user connected to node 11 a channel pair, for example in link 41, is seized and is marked busy in the corresponding route table 52. Suppose that the traffic increases and that finally all channel pairs 1–60 are busy. The next connection request requesting a resource from route 13 will trigger an infrastructure allocation process. After completion of the infrastructure allocation process described above stratum 1 has now at its disposal a link in the route which extends between A1 and A2. The two exchange terminals ET1 and ET2 will now provide 30 additional channel pairs to route 13. Said additional 30 channel pairs can now be used for traffic that originates and terminates at the stratum 1 level. When said link in said route has been assigned to stratum 1 the route table 52 will look like the one shown in FIG. 7 wherein the new, additional, 30 channel pairs are labeled 61–90. Among said additional channel pairs one is seized for the connection that triggered the allocation process. As traffic continues to increase further channel pairs are seized among said additional ones. To a user the assignment of said link in said route in stratum 2 to route 13 in stratum 1 is invisible, i.e. the user cannot distinguish a connection using link 40 from a connection using a dynamically established infrastructure through stratum 2.

As the traffic decreases and no channel pairs of the assigned link are used, the control logic resident in the resource handler 49 gives back the unoccupied link to stratum 2 and releases the connection A1-C1-ET-23-C2-A2 set up in the stratum 2.

Figure 8:
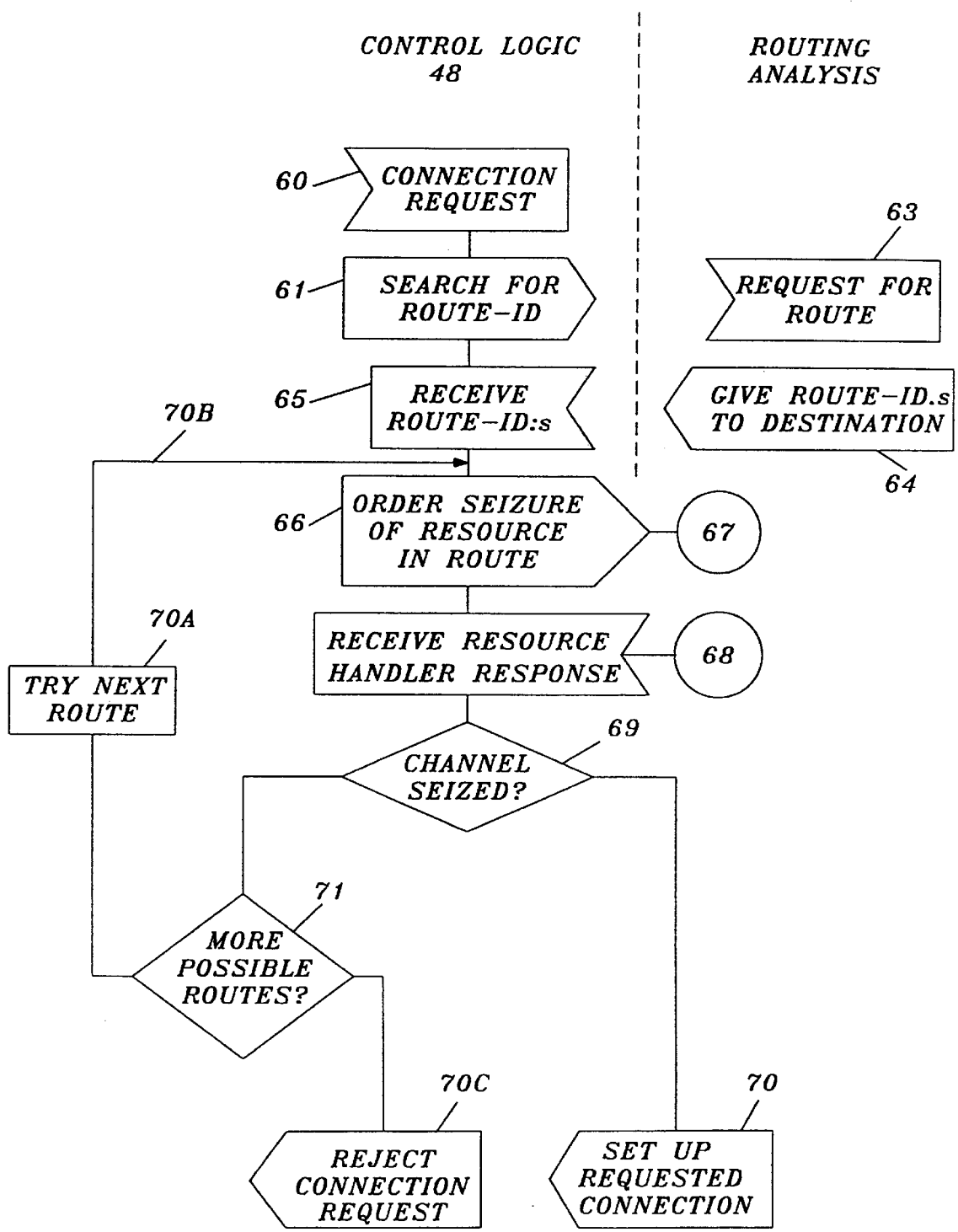
FIGS. 8–10 are flow diagrams, illustrating traffic system control logic involved in the process of dynamic allocation of an infrastructure.

The above resource allocation process will next be described in connection with FIG. 8–10. It is supposed a call should be set up between A and B in FIG. 4. In FIG. 8 the logic of the call set-up program 48 is shown to the left. To the right the logic of a routing analysis performed with the aid of the routing table of FIG. 11 is shown. A connection request, represented by box 60 is generated when user A dials the telephone number to user B. After conventional digit analysis the destination of the call is established. In order to find out the way to the destination routing analysis starts, box 61. For routing analysis in node 10 a routing table 62 of the kind shown in FIG. 11 is used. As input data for the routing analysis the destination of the call, in this case the identity, represented by N11 to node 11 is given. At the N11 entry the identities of the routes which are possible to use to node 11 are indicated, in this case the identity of route 13 represented as R13-ID. The search for the route to be used is indicated by box 63 in FIG. 8 and the process of returning the selected ROUTE-ID:s is represented by box 64. The call set-up program 48 receives the possible routes, box 65, and next the call set-up program orders that a resource, in the particular example which relates to a telephone call, a channel formed by a time slot that has fixed time position from frame to frame, in the first identified route should be seized, box 66. This seizure order is sent, ring 67, to the resource handler 49. The resource handler examines the list 52 of idle resources which corresponds to the selected resource to see if there is a resource free. The result is returned to the call set-up program as is represented by box 68. The result is either that a channel is seized or not. Which is the case is decided in selection box 69. If resources are free, alternative YES, the call set-up program 48 sets up a connection, box 70. If no resources are free, alternative NO, it is tested, decision box 71, if other routes were given in process step 64. If other routes were given, alternative YES, the next route is tried, box 70A, to see if a resource therein can be seized. This procedure is repeated until there is found a route, among said other routes, that has resources free. This repetitive procedure is illustrated by the loop arrows 70B. If none of said other routes contains any free resource, the connection request is rejected, box 70C.

Figure 9:
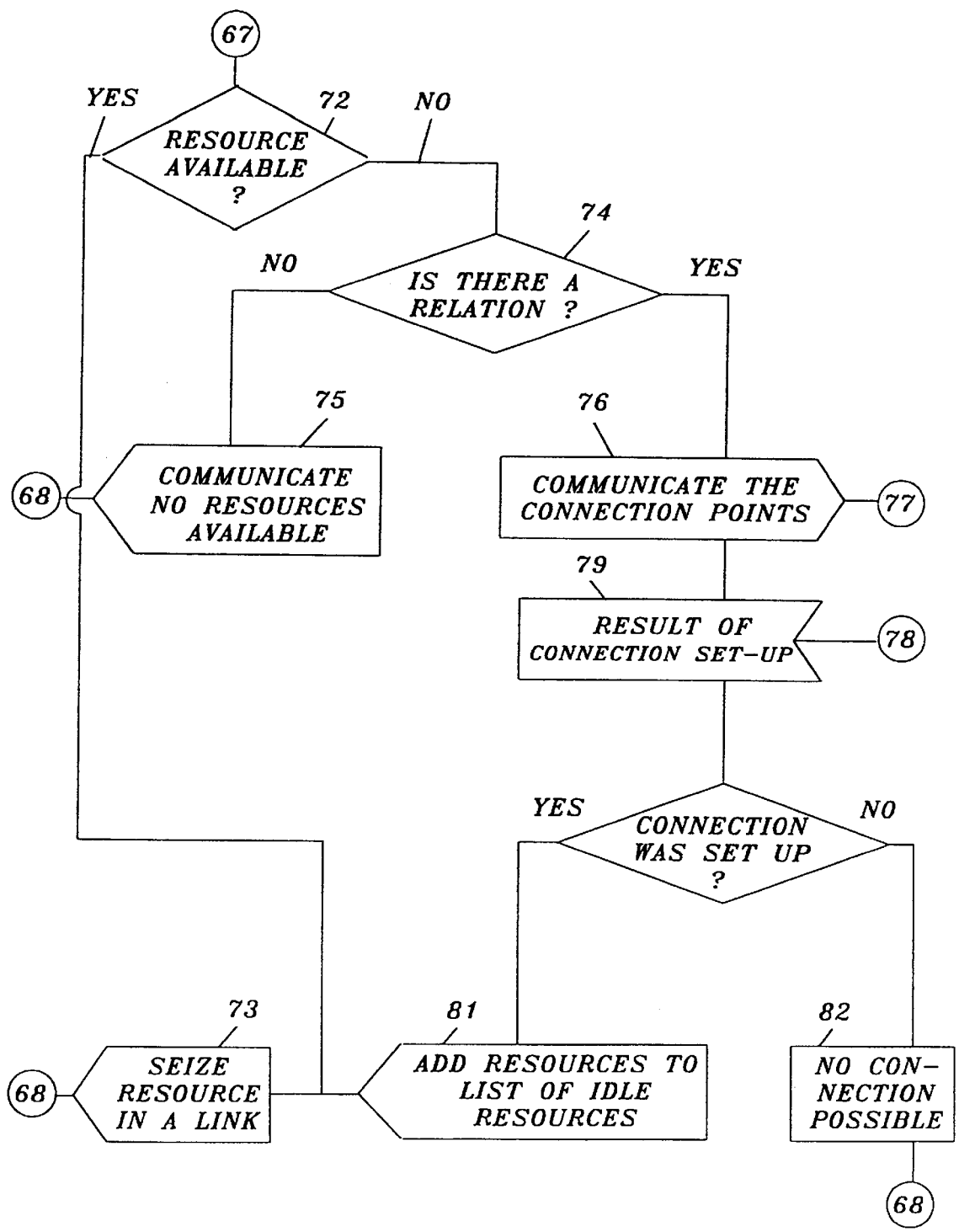

In FIG. 9 the logic of the resource handler 49 is illustrated. At receipt of the seizure order, ring 67, the resource handler examines the corresponding list 52 of idle resources to see if a resource is free, selection box 72. If a resource is free, alternative "YES", the resource handler 49 seizes the resource and sends the identity of the seized resource to the call set-up program 48 which will receive the resource identity at circle 68. If no resource is free, alterative "NO" at decision box 72 the resource handler checks to see if the selected resource has relation to an infrastructure, selection box 74. If the resource has no relation, alternative "NO", the resource handler communicates this to the call set-up program which receives corresponding message at circle 68. If there is a relation, alternative "YES", the resource handler 49 communicates the access points of the infrastructure, box 76, to the call set-up program 58 in stratum 2, circle 77. The call set-up program in stratum 2 is shown in FIG. 10 and is in principle similar to that shown in FIG. 8 and will therefore not be described in detail. From the call set-up program 58 the resource handler receives a communication, symbolized by circle 78, comprising information, box 79, on the result of the call set up in stratum 2. Either the requested connection was set up or not, alternative YES and NO respectively at decision box 80. If the connection was set up the additional resources, in form of channel pairs, is added to the list of idle resources, box 81, and a channel pair is seized, box 73, for the connection requested at the stratum 1 level. The seized channel pair is marked as "occupied for the requested connection" in the list of idle resources. A corresponding message is sent to the control logic 48, ring 68. If no connection could be set up at the stratum 2 level a corresponding message, box 82, is sent to the control logic 48 and the connection request made at the stratum 1 level is rejected.

Figure 10:
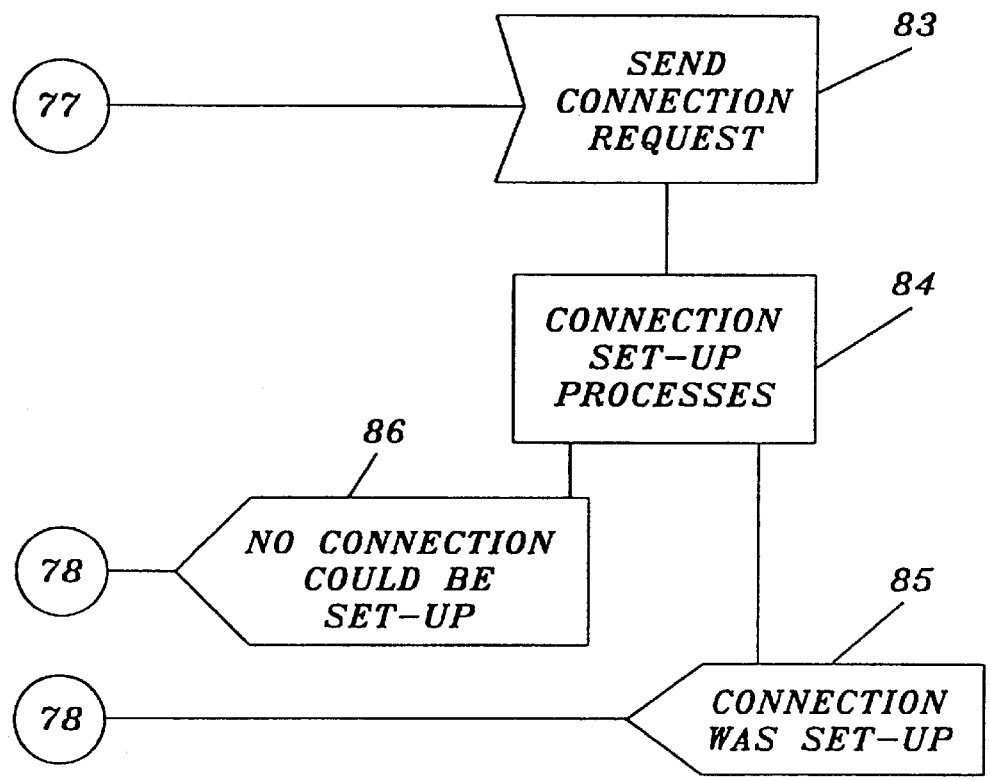
Figure 11:
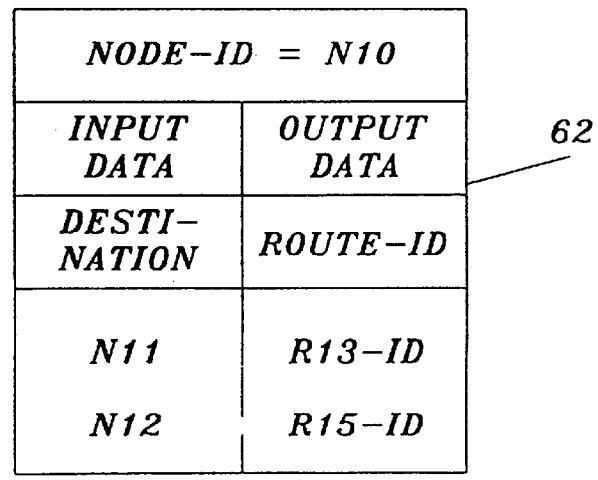
FIG. 11 is a routing table.
Figure 13:
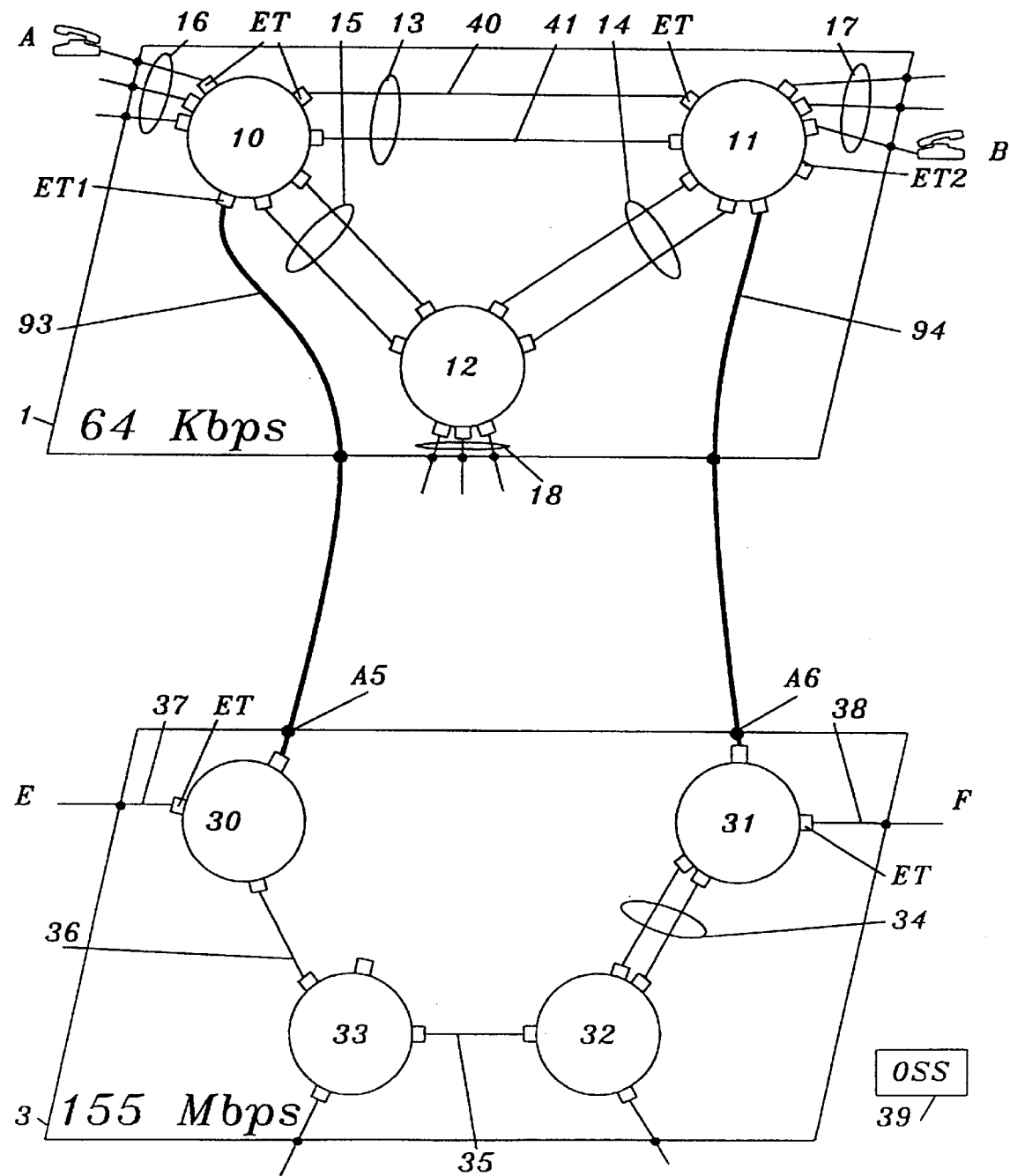
FIG. 13 is a simplified stratified network showing a variant of the dynamic allocation process in accordance with the invention.

In FIG. 10 the control program 58 in stratum 2 is shown. Upon receipt of the identity of the access points a connection request, box 83, is made to control logic of stratum 2. This connection request is processed in a manner similar to a connection request at the stratum 1 level as shown in FIG. 8. and will therefore not be described in detail. The various processes involved in setting up a connection at the stratum 2 level are shown collectively by box 84. The result is either that a connection is set up, box 85, or not, box 86. In both cases a corresponding message is sent to the link handler, ring 78. In the example described above the number of channel pairs of a route at stratum 1 is expanded by providing said route with a relation to two access points at stratum 2, said access points establishing the two end points of a possible connection at the stratum 2 layer. In accordance with the present invention a route, for example route 13, at stratum 1 can also be expanded by providing the route with a relation to two access points at the stratum 3 layer. Such relations pointing to the end points of a route at stratum 3 are shown at 87 and 88 respectively in FIG. 12A. To set up a connection at the stratum 3 level and use the infrastructure thus created in order to expand the number of available channel pairs at stratum 1 has been described above and will therefore not be repeated. It will be sufficient to say that in this embodiment there would be a first physical connection, similar to connection 4, between nodes 10 and 30 and a second physical connection between nodes 11 and 31. In FIG. 13 the corresponding infrastructure at stratum 3 has been shown. For the sake of clarity stratum 2 is not shown in FIG. 13. In this embodiment there is a first physical connection 93, similar to connection 4, between nodes 20 and 30 and a second physical connection 94 between nodes 21 and 31. The number of channel pairs assigned to stratum 1 is in this case in the order of 2100 since stratum 3 provides an infrastructure carrying 155 Mbps. The access points pointed out by the relations 87, 88 are labelled A5 and A6 respectively.

Also, in accordance with the invention, the number of channel pairs of a route at stratum 2 can be expanded by providing said route at stratum 2 with a relation to two access points at stratum 3. In FIG. 12B route 25 is provided with two such references 89, 90.

Figure 14:
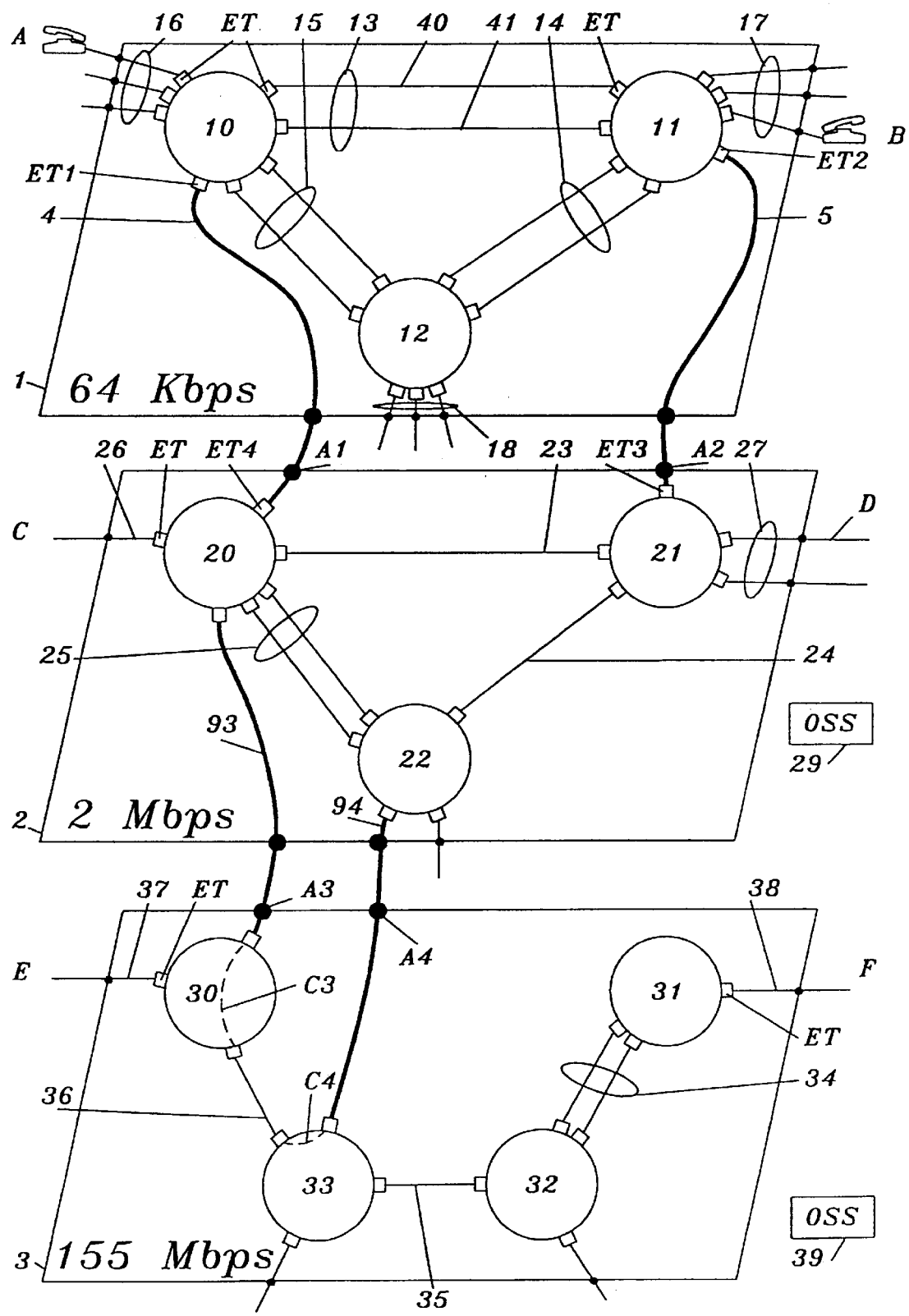
FIG. 14 is a simplified stratified network showing an example of an iterative dynamic allocation process.

It is also possible to apply the inventive idea repetitively from stratum to stratum. This is illustrated in FIG. 14. As an example, suppose a connection is requested from A to B at stratum 1 and that route 13 has no resources available. Route 13 has the above relations 50 and 51 to access points A1 and A2 at stratum 2. Suppose there are no resources available along route 23 that extends between access points A1 and A2. Along the alternative route between A1 and A2, that is along the combined route 25 and 24, route 25 is supposed to have no resources free, but route 25 has two references 89, 90, similar to those shown in FIG. 12B, that are associated with two access points A3 and A4 at stratum 3 via two physical connections 93 and 94. At stratum 3 there are resources free and an infrastructure, represented by the intra node connections C3 and C4 in nodes 30 and 33 and route 36, is assigned to stratum 2. Thus the connection requested at stratum 1 is set up using a connection set up at the stratum 3 level.

Figure 15:
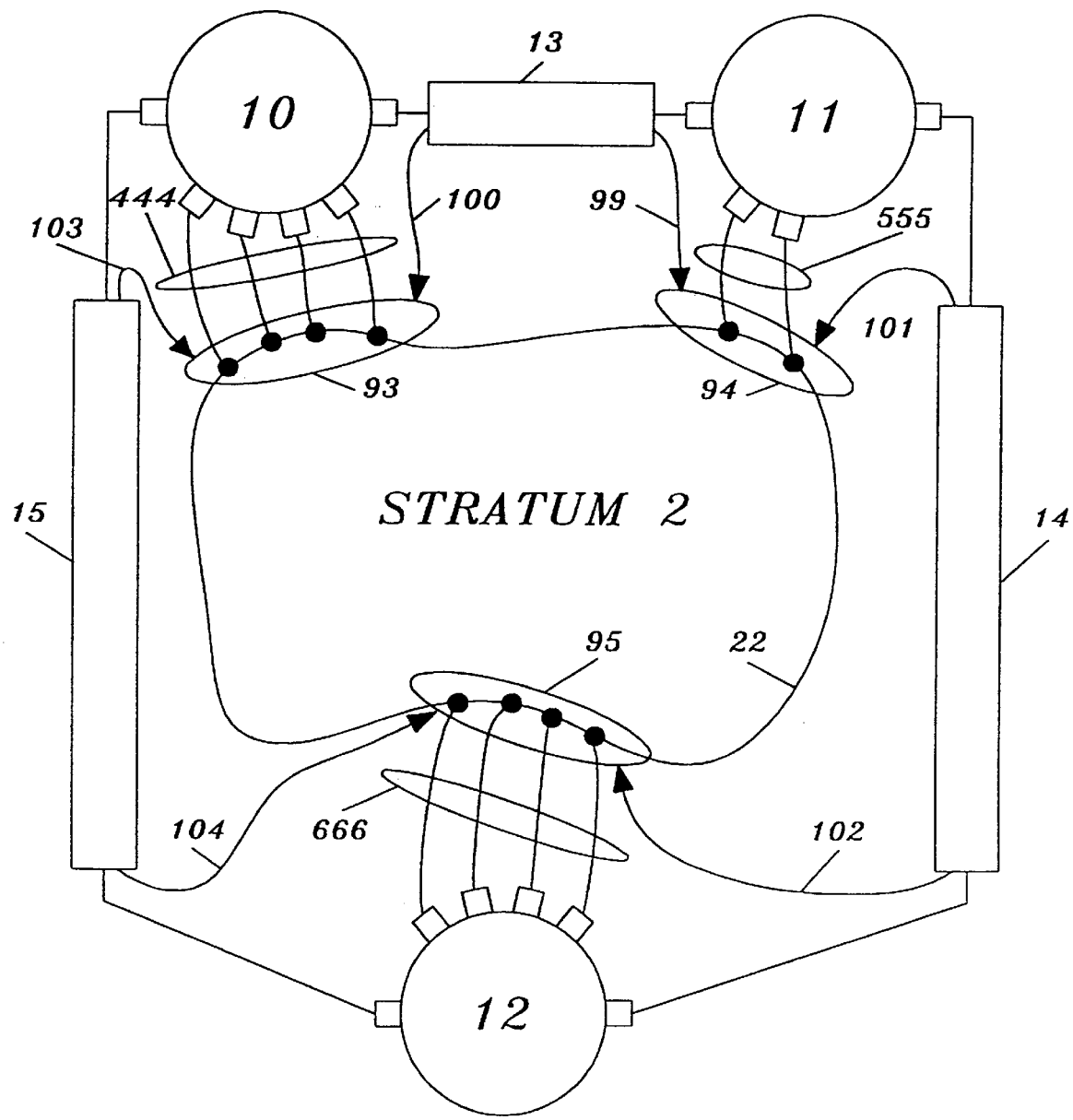
FIG. 15 is a schematic diagram showing a second embodiment of the invention.

In FIG. 15 a further embodiment of the invention is shown. In FIG. 15 the architecture of stratum 1 is generally the same as that shown in FIG. 3. From each of the nodes 10, 11 and 12 there are, however, a number of physical connections to exchange terminals ET residing in the second stratum 2, said second stratum being symbolically indicated by the area within the closed line 22. Node 1 has four such physical connections which collectively are indicated by reference numeral 444, node 11 has two such physical connections labeled 555 and node 12 has four physical connections 666. Each physical connection extends between two exchange terminals ET:s. The ends of the physical connections 444, 555, 666 to stratum 2 are symbolized by filled circles and are referred to as access points. The access points of connections 444 are collectively marked at 93, the access points of connections 555 are marked at 94 and the connections points of connections 666 are collectively referred to as 95. Outside the stratum 2 network and between the nodes 10, 11, 12 the routes 13, 14 and 15 are present. Each route has a relation in the form of pointers pointing out the end points of the respective route. Accordingly route 13 has two pointers 99, 100 of which 99 points to the group of access points 95 while 100 points to the group of access points 93. In a similar way route 14 has two pointers 101, 102 pointing out its respective end points in stratum 2. Pointer 101 points to the group of access points 94 and pointer 102 points to the group of access points 95. Route 15 has two pointers 103, 104 pointing out its respective end points in stratum 2. In particular pointer 103 points to the group of access points 93 while pointer 104 points to the group of access points 95. If a route, for example route 15, which extends between nodes 10 and 12 needs resources from stratum 2 the link handler 49 selects the group of access points 93 and the group of access points 95 since these two groups of points represent the end points of a link in the route which extends between nodes 10 and 12. In stratum 2 a connection is set up between two selected access points in groups 93 and 95. The individual connection to be set up in stratum 2 may be selected using a conventional resource allocation algorithm which examines the traffic along the routes of stratum 2 and based upon this examination selects which route to follow in stratum 2.

Although three strata 1, 2 and 3 have been described above the telecommunication network may comprise four strata or more, or even just two strata, and the inventive method and the inventive construction would be applicable.

A route may extend over several links, some of them being fixed and some of them being allocated dynamically as described above. The effect of this is that a route will comprise a fixed number of resources which are always present. On top of these there are a number of resources that can be dynamically allocated to the route.

The control logic for requesting a connection at stratum 1 has above been described to be resident in stratum 1 and has been described to be executed by a processor which belongs to stratum 1 while the control logic for setting up a connection in stratum 2 has been described to be resident in stratum 2 and has been described to be executed on a processor which belongs to stratum 2. It is, however, not necessary to split up the control logic and its execution on processors which belong to different strata. The invention is equally well achieved if one and the same processor executes the control logic of the two strata and it is of no difference if this processor belongs to one stratum or the other. The processor may even be distributed among several nodes of one and the same stratum. The control logic which above has been described as split up between different strata may, in accordance with the present invention, be integrated and may be executed on a single processor or on a distributed processor. The control logic, be it structured in several strata or not, and the processor, be it a single processor or a distributed processor, on which it executes forms a control system of the telecommunication network.

What is claimed is:

1. A method of dynamic resource allocation in a stratified network structure including a dynamically switched first stratum network with switch fabrics, first routes, and user access units, and at least a second stratum network underlying the first overlying stratum and including nodes and second routes, the first and second stratum networks forming a traffic system, and a route in the first stratum network including a first number of resources, the method comprising the steps of:

providing at least a first one of the first routes in the first stratum network in the stratified network structure with a first relation that points out two access points in the second stratum network in the stratified network structure;

establishing a connection between the access points in the second stratum network, the connection including a second number of resources generally referred to as an infrastructure, in response to fulfillment of predetermined traffic sensitive conditions along the first route; and assigning the infrastructure to the first route.

2. The method of claim 1, further comprising the steps of:
   (1) associating the first relation with a first and a second end respectively of the first route,
   (2) the first end of the first route being connected to a first node in the first stratum,
   (3) the second end of the first route being connected to a second node in the first stratum,
   (4) providing the first node with at least a first physical connection extending between the first node and the first access point in the second stratum network,
   (5) providing the second node with at least a second physical connection extending between the second node and the second access point in the second stratum network, and
   (6) interconnecting the first and second access points in the second stratum network.

3. The method of claim 2, wherein the fulfillment of the traffic sensitive conditions occurs when a predetermined number of the first number of resources of the first route are busy.

4. The method of claim 2, further comprising the steps of:
   selecting the first access point among a first group of first access points, each of which has an individual physical connection to the first node, and selecting the second access point among a second group of access points, each of which has an individual physical connection to the second node.

5. The method of claim 4, further comprising the step of initiating the connection from control logic resident in a traffic system controlling the first and second stratum networks.

6. The method of claim 4, further comprising the step of initiating the connection by a signalling session, using an external protocol, between the first and second stratum, during which session the first stratum orders the second stratum to establish a connection between the two allocations points.

7. The method of claim 1, further comprising the steps of:
   (a) providing a second route in the second stratum with a second relation that points out two second access points in a third stratum underlying the first and second strata, and
   (b) assigning to the second route the resources of a second connection that is set up in the third stratum between the second access points in response to fulfillment of predetermined traffic sensitive conditions along the second route.

8. The method of claim 7, wherein steps (a) and (b) are repeated for successively underlying strata.

9. The method of claim 7, further comprising the step of returning the infrastructure to the second network when all of the second number of resources have been released.

10. The method of claim 1, wherein the relation points out two access points resident in a third stratum underlying the second stratum.

11. A system for dynamic allocation of resources in a stratified network structure having a first stratum network with switch fabrics, trunks, and user access units, and a second stratum network having nodes and trunks, a first route in the first stratum network including a first number of resources, the system comprising:

at least a first physical connection extending between a first node in the first stratum network in the stratified network structure and a first access point in the second stratum network in the stratified network structure, at least a second physical connection extending between a second node in the first stratum network in the stratified network structure and a second access point in the second stratum network in the stratified network structure, and traffic intensity sensitive means for initiating set up of a connection between the first and second access points in the second stratum network.

12. The system of claim 11, wherein the first and second physical connections both support the same bandwidths of connections.

13. The system of claim 11, wherein the traffic intensity sensitive means comprises a list of idle resources associated with the first route, the list including (a) a list of each of the first number of channel pairs and a respective busy/non-busy status of each of the channel pairs, and (b) a relation including two references, each reference pointing out a respective one of the first and second access points in the second stratum.

14. The method of claim 11, wherein the second stratum network is associated with a bearer service, the second stratum network and the bearer service underlying the first overlying stratum network.

15. The system of claim 12, wherein the second stratum network is associated with a bearer service, the second stratum network and the bearer service underlying the first overlying stratum network.

16. The system of claim 11, wherein the first physical connection is wired.

* * * * *

UNITED STATES PATENT AND TRADEMARK OFFICE
CERTIFICATE OF CORRECTION

PATENT NO. : 5,936,951
DATED : August 10, 1999
INVENTOR(S) : Staffan ANDERSSON et al.

It is certified that error appears in the above-identified patent and that said Letters Patent is hereby corrected as shown below:

Column 14, claim 14, line 26, delete "11" and insert therefore --1--.

Signed and Sealed this

Nineteenth Day of September, 2000

Attest:

Q. TODD DICKINSON

Attesting Officer

Director of Patents and Trademarks